Nov. 8, 1955   E. A. HERIDER   2,722,975
SPRING CUSHION ASSEMBLY
Filed June 3, 1950
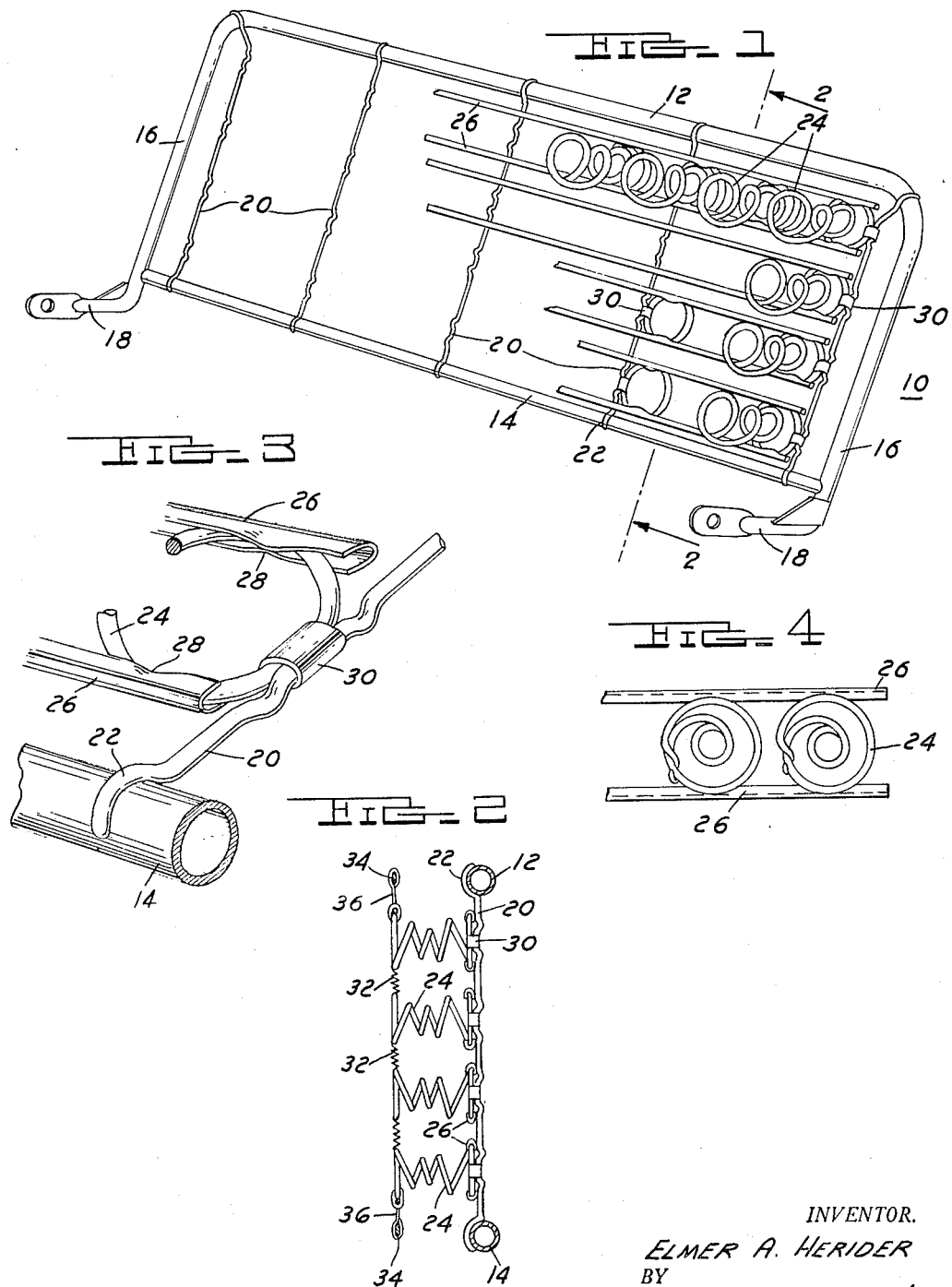
INVENTOR.
ELMER A. HERIDER
BY
Burton & Parker
ATTORNEYS

United States Patent Office 2,722,975
Patented Nov. 8, 1955

2,722,975

SPRING CUSHION ASSEMBLY

Elmer A. Herider, Dearborn, Mich., assignor, by mesne assignments, to Rockwell Spring and Axle Company, Coraopolis, Pa., a corporation of Pennsylvania Application June 3, 1950, Serial No. 165,928

3 Claims. (Cl. 155—179)

This invention relates to an improved spring cushion assembly and particularly to one suitable for use in an automobile seat or back cushion.

An object is to provide such a spring cushion assembly which employs a plurality of individual coil or hour glass springs supported within a frame, as for example an automobile seat or back frame, in such a manner as to constitute a self-contained integral structural unit. Such spring cushion assembly is of a strong and sturdy construction, is light in weight and is relatively less expensive than conventional coil spring assemblies now in use.

Heretofore it has been common practice to employ in an automobile seat or back a coil spring assembly unit, which assembly unit consists of a plurality of coil or hour glass springs assembled together within an enclosure formed by upper and lower boundary wires extending about the upper and lower margins of the assembly, and which assembly unit was itself mounted within a seat or back frame. Such a frame was generally rectangular in shape and commonly of tubular construction. The spring assembly was disposed within the frame and the lower boundary wires of the unit were gripped by clips or the like to the frame. The coil spring assembly unit might be fabricated by a spring manufacturer and the tubular frame structure by another manufacturer and the two assembled together by the automobile body builder.

In the improved spring cushion assembly of this application the prefabrication of the assembly unit of coil springs is omitted, the lower boundary wires which were attached to the frame are eliminated, the frame of the seat or back is provided with transverse struts extending between and permanently secured to opposite sides of the frame. For example, such struts extend between and are secured to its front and rear or top and bottom rolls, as the case may be, depending upon whether a seat or back is being fabricated. The coil or hour glass springs, arranged in a series of linear lengths, are mounted upon said struts and secured thereto thereby forming an integral unitary self-contained spring cushion assembly.

Such spring cushion assembly is complete in and of itself. It is built as a unit upon the frame structure which forms the foundation therefor and constitutes an integral unitary construction. It is complete for trimming with the upholstery cushioning material and fabric.

Various other objects, advantages and meritorious features of this improved spring cushion assembly will more fully appear from the following specification, claims and accompanying drawing, wherein:

Fig. 1 is a perspective of an automobile seat back spring cushion embodying the invention, partly broken away to show more clearly the construction;

Fig. 2 is a cross sectional view taken on the line 2—2 of Fig. 1;

Fig. 3 is a perspective of a fragment of the spring cushion showing the mounting of the coil springs upon the frame; and Fig. 4 is a plan of a fragment of the spring cushion showing the arrangement of the separate coil springs in a series or line between longitudinal supporting strips.

The improved spring cushion assembly of this application is illustrated in an automobile seat back cushion. It is understood that it is adaptable to a seat cushion as well as to a back cushion. The seat back frame is of tubular construction and is indicated as 10 and comprises top and bottom longitudinal portions 12 and 14, respectively, and end portions 16. The end portions 16 are provided with angular extensions 18 at their lower ends adapted to be hinged to the seat proper in a manner well understood.

This frame structure is provided with transverse struts 20 extending between and welded or otherwise permanently secured to the longitudinal portions 12 and 14. These transverse struts 20 are provided in such number as may be desired, five being here shown. They are provided with arcuate saddle-like end parts 22 designed to seat over the tubular portions 12 and 14 so that each strut extends between these tubular portions substantially within the plane of the tubular frame as illustrated particularly in Fig. 2. This frame structure with the transverse struts permanently affixed thereto constitutes the foundation upon which the coil springs are assembled.

Coil springs 24 are provided in such shape and number as is desired. They are here shown as of the hour glass shape. A plurality of such individual spring elements are arranged in a line between a pair of longitudinal coil retaining strips 26. These strips 26 are in the form of sheet metal channel members. The lower convolutions of each coil spring 24 is seated within the complementary channels and the side walls of the channels are pinched together as at 28 to hold such coils therein. A plurality of individual coils are thus disposed in line between a pair of channels 26.

These strips or linear lengths of coils are provided in such length as is desired to suit the particular frame and are mounted upon the struts 20, as shown in Figs. 1 and 3. Clips 30 are provided to secure the coils to the struts 20. The upper ends of the coils may be yieldingly connected together by torsion springs 32, as shown in Fig. 2. An upper boundary wire 34 may be secured by clips 36 to extend along the upper margin of the cushion assembly, as shown in Fig. 2.

Such a spring cushion assembly constitutes an integral self-contained unit complete in itself. It reduces to the minimum the material required to make up the assembly.

What I claim is:

1. A spring cushion assembly comprising an integral substantially rectangular tubular frame provided with a plurality of struts extending between and permanently secured to opposite sides of said frame, such struts being saddle-shaped at the ends and seating over the frame portions so that the strut extends between the frame portions substantially within the plane thereof, a plurality of linear series of coil springs, each linear series consisting of a plurality of individual coil spring elements disposed in spaced linear succession between a pair of opposed complementary channel shaped retaining strips, the open channels of said strips facing each other and engaged over the opposite sides of the bottom coil of each coil spring element, the opposite walls of the channel of the strips pinched together within the bottom coils, each such linear series extending across a plurality of said struts with the bottom coils of some of said coil springs intermediate the opposite ends of each series secured to the struts to support the series within the tubular frame and having the opposite end coils in each series secured to the opposite end struts of the frame structure.

2. A spring cushion assembly comprising an integral rigid substantially rectangular tubular seat frame, a plurality of spaced apart struts extending between and permanently secured to opposite sides of said frame and with the two opposite end struts spaced from the opposite ends of the frame, such struts seating upon the frame portions so that the struts extend between the frame portions substantially within the plane thereof, a plurality of linear series of coil springs extending transversely across the struts intermediate the two opposite end struts, each linear series consisting of a plurality of individual coil spring elements disposed in spaced linear succession between a pair of opposed complementary channel shaped retaining strips, the open channels of said strips facing each other and engaged over the opposite sides of the bottom coil of each coil spring element with the opposite ends of the strips spaced inwardly from the opposite end struts, the opposite walls of the channel of the strips pinched together within the bottom coils, each such linear series having the coil springs disposed in groups between the cross struts with the coil spring at one end of each group disposed adjacent a cross strut, a spring clip engaged over the lower coil of the coil spring at the said one end of each group and over the adjacent cross strut to secure the coil spring to the cross strut and position the strips and the series in fixed transverse relation on the struts, the lower coil of each of the end coil springs of each series disposed adjacent the opposite end strut, and a spring clip engaged over such lower coil of the end coil springs of each series and over the opposite end struts to secure the opposite end of each series to the opposite end struts.

3. A spring cushion assembly comprising an integral rigid substantially rectangular seat frame forming the supporting structure for a cushion assembly, a plurality of spaced apart struts extending between and attached to the opposite sides of the frame with the end struts spaced from the ends of the frame and with the struts lying within the plane of the frame, a plurality of linear series of coil springs extending transversely across the struts, each linear series consisting of a plurality of individual coil spring elements disposed in spaced linear succession between a pair of opposed complementary channel shaped retaining strips, the open channels of said strips facing each other and engaged over the opposite sides of the bottom coil of each coil spring element and secured thereto, each strut shaped to exhibit spaced apart pairs of kinks linearly thereof, the two complementary strips of each linear series of coil springs being disposed upon opposite sides of a pair of kinks of the struts bridged by the linear series, the lower coils of certain springs of each linear series connected to said struts between the two kinks of a pair of kinks disposed between the complementary strips engaging the coil springs to position the arrangement of springs within the seat frame and upon the struts.

References Cited in the file of this patent
UNITED STATES PATENTS

| | | |
|---|---|---|
| 790,614 | Bridgewater | May 23, 1905 |
| 1,014,736 | Young | Jan. 16, 1912 |
| 2,031,745 | Stubnitz | Feb. 12, 1936 |
| 2,098,649 | Sargent | Nov. 9, 1937 |
| 2,199,382 | Widman | May 7, 1940 |
| 2,260,954 | Robinson | Oct. 28, 1941 |
| 2,418,697 | Caughey | Apr. 8, 1947 |